United States Patent  
Baghel et al.

(10) Patent No.: US 11,723,012 B2  
(45) Date of Patent: Aug. 8, 2023

(54) VEHICLE-TO-EVERYTHING (V2X) DESTINATION IDENTIFICATION SHARING FOR INTER-USER EQUIPMENT (UE) COORDINATION

(71) Applicant: QUALCOMM Incorporated, San Diego, CA (US)

(72) Inventors: Sudhir Kumar Baghel, Hillsborough, NJ (US); Junyi Li, Fairless Hills, PA (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/316,623

(22) Filed: May 10, 2021

(65) Prior Publication Data

US 2021/0352679 A1 Nov. 11, 2021

Related U.S. Application Data

(60) Provisional application No. 63/023,164, filed on May 11, 2020.

(51) Int. Cl.
*H04W 72/12* (2023.01)
*H04W 4/40* (2018.01)
*H04W 24/08* (2009.01)

(52) U.S. Cl.
CPC ............. *H04W 72/12* (2013.01); *H04W 4/40* (2018.02); *H04W 24/08* (2013.01)

(58) Field of Classification Search
CPC ......... H04W 72/1205; H04W 72/1231; H04W 72/1278; H04W 4/40; H04W 24/08; H04W 92/18
See application file for complete search history.

(56) References Cited

U.S. PATENT DOCUMENTS

| | | | |
|---|---|---|---|
| 10,080,251 B2 * | 9/2018 | Chen | H04W 8/005 |
| 11,032,849 B2 * | 6/2021 | Li | H04W 72/0473 |
| 11,246,114 B2 * | 2/2022 | Khoryaev | H04W 4/40 |
| 2016/0007304 A1 * | 1/2016 | Morita | H04W 52/0209 370/311 |

(Continued)

OTHER PUBLICATIONS

International Search Report and Written Opinion—PCT/US2021/031858—ISA/EPO—dated Jul. 9, 2021.

(Continued)

*Primary Examiner* — Hassan Kizou
*Assistant Examiner* — Hector Reyes
(74) *Attorney, Agent, or Firm* — Qualcomm Incorporated/Seyfarth Shaw LLP

(57) ABSTRACT

A method of wireless communication wireless communication by an identifier-receiving user equipment (UE) includes measuring a received signal power of multiple resource UEs. The method also includes receiving a set of identifiers from an identifier-transmitting UE. The method further includes identifying a resource used by at least one of the multiple resource UEs for a future transmission from the identifier-receiving UE based on the measured received signal power and the received set of identifiers. The method still further includes scheduling the future transmission on the at least one identified resource.

20 Claims, 10 Drawing Sheets

(56) References Cited

U.S. PATENT DOCUMENTS

| | | | |
|---|---|---|---|
| 2019/0230547 A1* | 7/2019 | Li | H04W 72/121 |
| 2020/0367221 A1* | 11/2020 | Maaref | H04W 72/085 |
| 2021/0035267 A1 | 2/2021 | Keh et al. | |
| 2023/0028098 A1* | 1/2023 | Lin | H04W 24/08 |

OTHER PUBLICATIONS

Ericsson: "On Mode 2 Resource Allocation for NR Sidelink," 3GPP Draft, 3GPP TSG-RAN WG1 Meeting #95, R1-1813641, Ericsson—On Mode 2 Resource Allocation for NR Side Link, 3rd Generation Partnership Project (3GPP), Mobile Competence Centre, 650, Route Des Lucioles, F-06921, Sophia-Antipolis Cedex, France, vol. RAN WG1, No. Spokane, WA, US, Nov. 12, 2018-Nov. 16, 2018, Nov. 11, 2018 (Nov. 11, 2018), XP051555699, 15 pages, section 5.3, the Whole Document.

Qualcomm Incorporated: "Sidelink Resource Allocation Mechanism for NR V2X", 3GPP TSG RAN WG1 Ad-Hoc Meeting 1901, R1-1900887_Sidelink Resource Allocation Mechanism for NR V2X, 3rd Generation Partnership Project, Mobile Competence Centre, 650, Route Des Lucioles, F-06921 Sophia-Antipolis Cedex, vol. RAN WG1, No. Taipei, Taiwan, Jan. 21, 2019-Jan. 25, 2019, Jan. 12, 2019, XP051576424, 10 pages, paragraph [0001], paragraph [0003], paragraph [0006], paragraph [0009], figures 2,3, p. 4-p. 6.

* cited by examiner

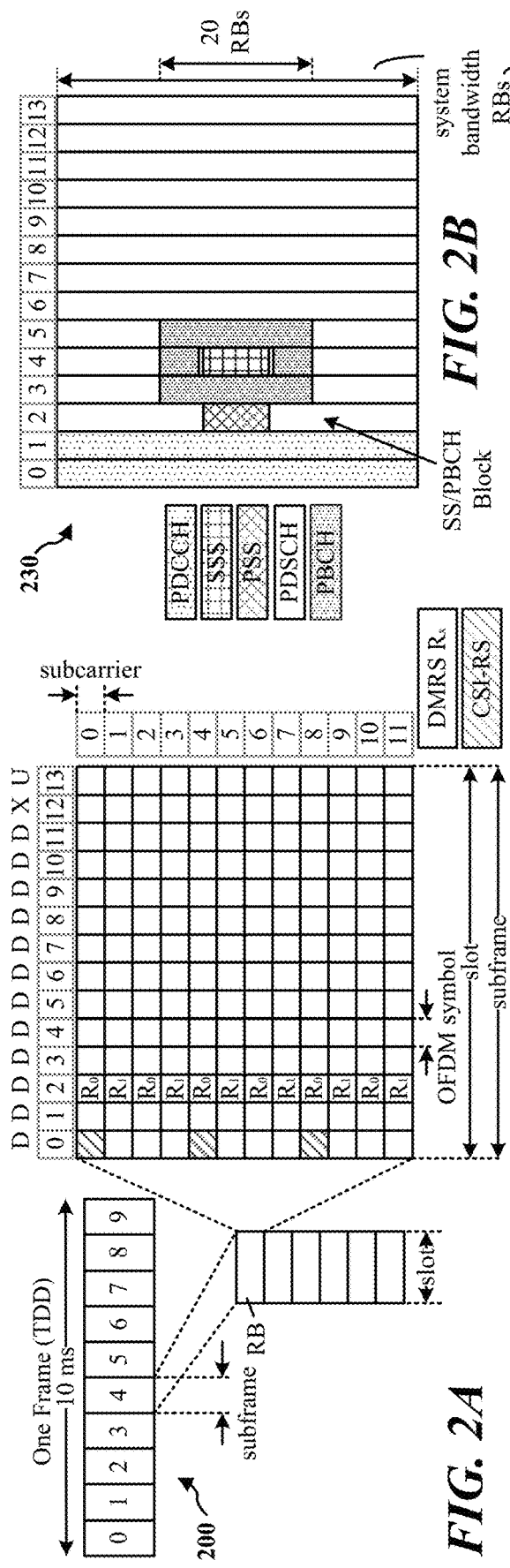
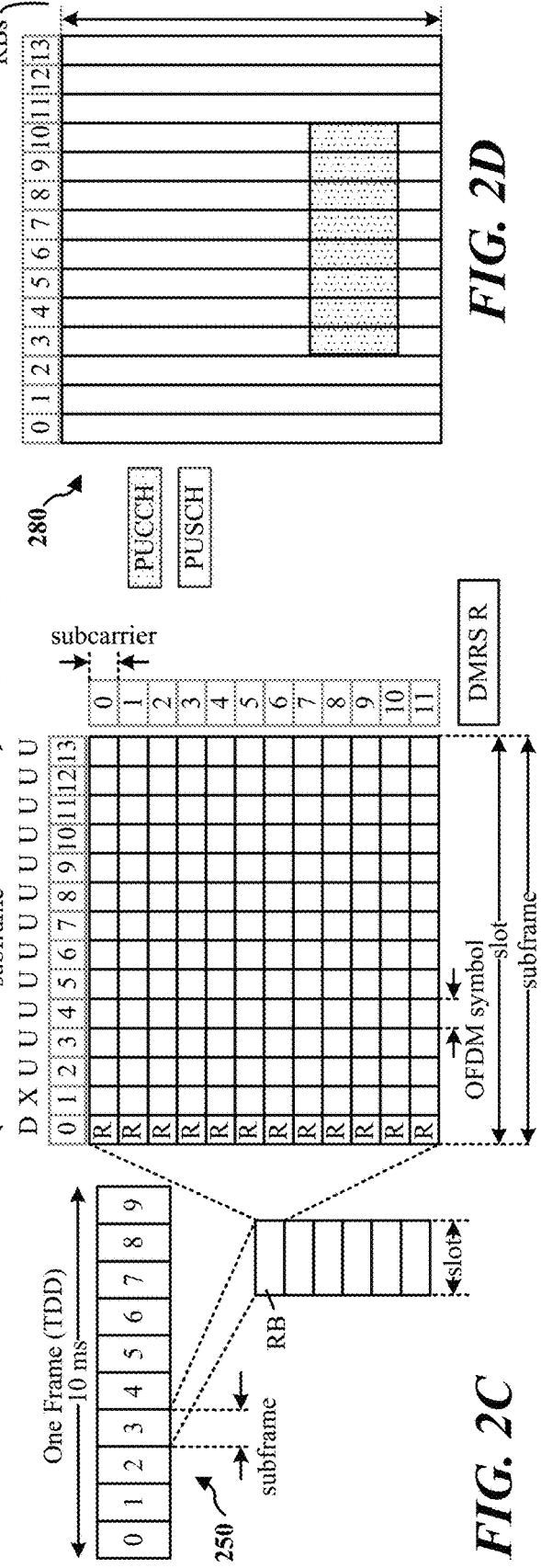

VEHICLE-TO-EVERYTHING (V2X) DESTINATION IDENTIFICATION SHARING FOR INTER-USER EQUIPMENT (UE) COORDINATION

CROSS REFERENCE TO RELATED APPLICATION

This application claims the benefit of U.S. Provisional Application No. 63/023,164, titled "NEW RADIO (NR) VEHICLE-TO-EVERYTHING (V2X) DESTINATION IDENTIFICATION SHARING FOR INTER-USER EQUIPMENT (UE) COORDINATION," filed on May 11, 2020, the disclosure of which is expressly incorporated by reference in its entirety.

FIELD OF THE DISCLOSURE

Aspects of the present disclosure generally relate to wireless communications, and more particularly to techniques and apparatuses for vehicle-to-everything (V2X) inter-user equipment (UE) coordination.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC), some or all of which can be valuable in vehicle-to-everything (V2X) communications systems. Some aspects of 5G NR may be based on the fourth generation (4G) long term evolution (LTE) standard.

Wireless communications systems may include or provide support for various types of communications systems, such as vehicle related communications systems (e.g., V2X communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, vehicles may communicate directly with each other using device-to-device (D2D) communications over a D2D wireless link.

As the demands for vehicle related communications increase, different V2X communications systems compete for the same wireless communications resources. Accordingly, improvements to the allocation of wireless communications resources remain useful.

SUMMARY

In one aspect of the present disclosure, a method for wireless communication by an identifier-receiving user equipment (UE) disclosed. The method includes measuring a received signal power of multiple resource UEs. The method also includes receiving a set of identifiers from an identifier-transmitting UE. The method further includes identifying one or more resources used by one or more of the resource UEs for a future transmission based on the measured received signal power and the received set of identifiers. The method still further includes scheduling the future transmission on the one or more identified resources.

Another aspect of the present disclosure is directed to an apparatus for wireless communication at an identifier-receiving UE. The apparatus includes means for measuring a received signal power of multiple resource UEs. The apparatus also includes means for receiving a set of identifiers from an identifier-transmitting UE. The apparatus further includes means for identifying one or more resources used by one or more of the resource UEs for a future transmission based on the measured received signal power and the received set of identifiers. The apparatus still further includes means for scheduling the future transmission on the one or more identified resources.

In another aspect of the present disclosure, a non-transitory computer-readable medium with program code recorded thereon for wireless communication at an identifier-receiving UE is disclosed. The program code is executed by a processor and includes program code to measure a received signal power of multiple resource UEs. The program code also includes program code to receive a set of identifiers from an identifier-transmitting UE. The program code further includes program code to identify one or more resources used by one or more of the resource UEs for a future transmission based on the measured received signal power and the received set of identifiers. The program code still further includes program code to schedule the future transmission on the one or more identified resources.

Another aspect of the present disclosure is directed to an apparatus for wireless communication at an identifier-receiving UE, the apparatus includes a processor, and a memory communicatively coupled with the processor and storing instructions that, when executed by the processor, cause the apparatus to measure a received signal power of multiple resource UEs. Execution of the instructions also cause the apparatus to receive a set of identifiers from an identifier-transmitting UE. Execution of the instructions further cause the apparatus to identify one or more resources used by one or more of the resource UEs for a future transmission based on the measured received signal power and the received set of identifiers. Execution of the instructions still further cause the apparatus to schedule the future transmission on the one or more identified resources.

In one aspect of the present disclosure, a method for wireless communication by an identifier-transmitting UE is disclosed. The method includes measuring a received signal power of multiple resource UEs. The method also includes generating a set of identifiers by adding a resource UE of the resource UEs to the set of identifiers when the received signal power of the resource UE is greater than an identifier-transmitting UE received signal power threshold. The method further includes transmitting the set of identifiers to an identifier-receiving UE.

Another aspect of the present disclosure is directed to an apparatus wireless communication at an identifier-transmitting UE. The apparatus includes means for measuring a received signal power of multiple resource UEs. The apparatus also includes means for generating a set of identifiers by adding a resource UE of the resource UEs to the set of identifiers when the received signal power of the resource UE is greater than an identifier-transmitting UE received signal power threshold. The apparatus further includes means for transmitting the set of identifiers to an identifier-receiving UE.

In another aspect of the present disclosure, a non-transitory computer-readable medium with program code recorded thereon for wireless communication at an identifier-transmitting UE is disclosed. The program code is for wireless communication. The program code is executed by a processor and includes program code to measure a received signal power of multiple resource UEs. The program code also includes program code to generate a set of identifiers by adding a resource UE of the resource UEs to the set of identifiers when the received signal power of the resource UE is greater than an identifier-transmitting UE received signal power threshold. The program code further includes program code to transmit the set of identifiers to an identifier-receiving UE.

Another aspect of the present disclosure is directed to an apparatus for wireless communication at an identifier-transmitting UE, the apparatus includes a processor, and a memory communicatively coupled with the processor and storing instructions that, when executed by the processor, cause the apparatus to measure a received signal power of resource UEs. Execution of the instructions further cause the apparatus to generate a set of identifiers by adding a resource UE of the resource UEs to the set of identifiers when the received signal power of the resource UE is greater than an identifier-transmitting UE received signal power threshold. Execution of the instructions further cause the apparatus to transmit the set of identifiers to an identifier-receiving UE.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a description may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

DETAILED DESCRIPTION

Figure 1:
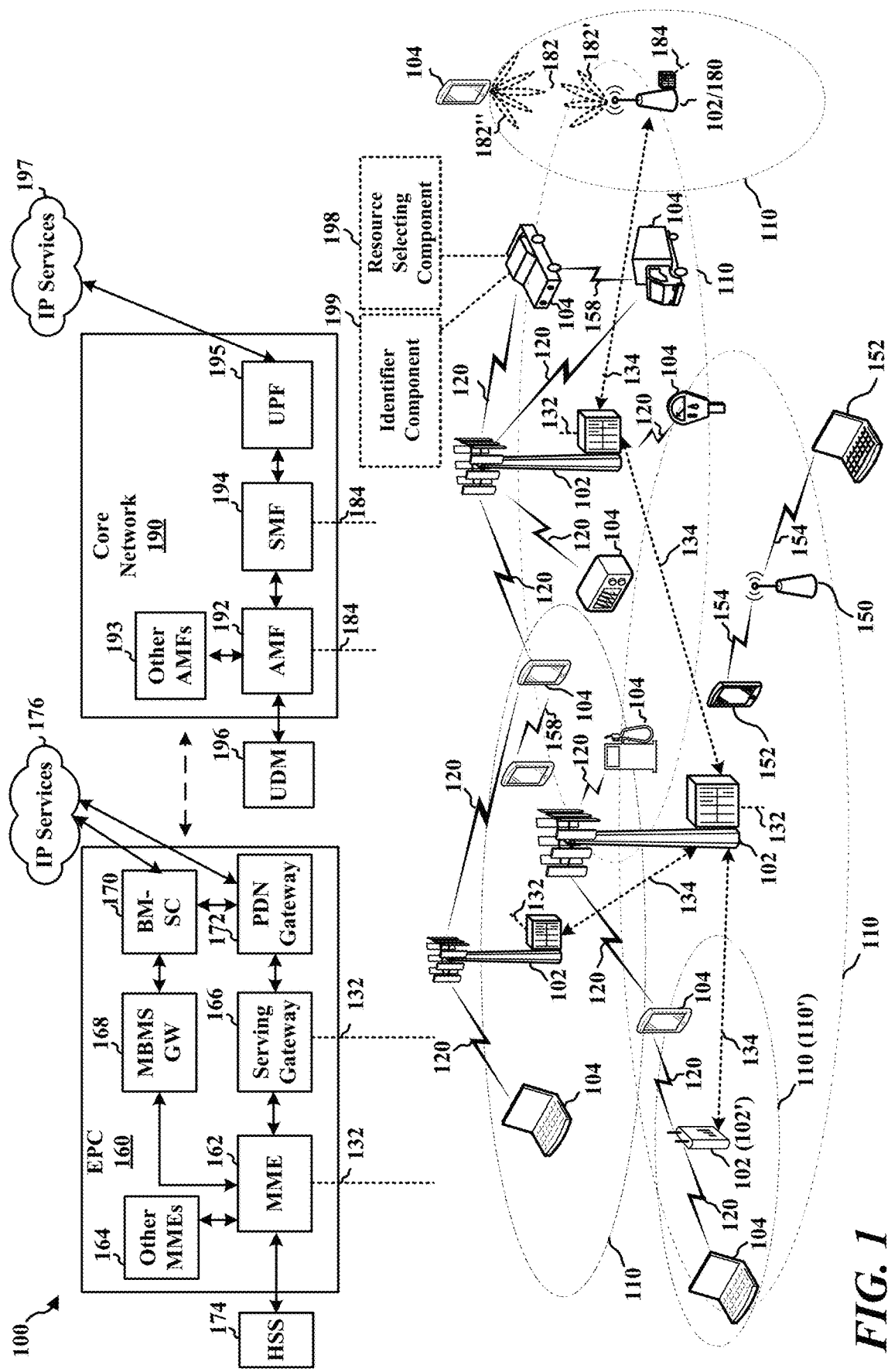
FIG. 1 is a diagram illustrating an example of a wireless communications system and an access network.

Various aspects of the disclosure are described below with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

For example, when two vehicles approach an intersection, various bits of information gathered by the sensors of the two vehicles may be shared via V2X communications. The information may be shared even when the two vehicles do not have a direct line of sight to each other. Also, information gathered by the sensors of a first vehicle may be shared with other vehicles or devices within a communications coverage area.

To improve the relatability of sidelink transmissions, UEs may inter-coordinate to share resource information when the UEs support autonomous resource selection. That is, a resource UE may identify communications resources. The communications resources identified by the resource UE may be referred to as sensing information. The resource UE may transmit the sensing information (e.g., identified communications resources) to resource-receiving UE, such as an identifier-transmitting UE or an identifier-receiving UE. The resource-receiving UE may consider the sensing information when selecting resources for a sidelink transmission. In this example, the resource-receiving UE may also perform measurements to identify communications resources. As such, the resource-receiving UE may pool the sensing information with its own identified communications resources. Aspects of the present disclosure are directed to improving inter-UE coordination.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a packet switched (PS) streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may receive sensing information from one or more other UEs 104. The UE 104 that received the sensing information may also obtain sensing information from its own measurements. The UE 104 may include a resource selecting component 198 configured to measure a first received signal power of multiple UEs. The resource selecting component 198 may also be configured to receive a set of identifiers from a first UE. The resource selecting component 198 may further be configured to identify a resource of a second UE from the multiple UEs for a future transmission based on the first received signal power and the received set of identifiers. The resource selecting component 198 may still further be configured to schedule the future transmission on at least one identified resource.

Additionally, or alternatively, the UE 104 may include an identifier component 199 configured to measuring a first received signal power of multiple UEs. The identifier component 199 may also be configured to generate a set of identifiers by adding each UE of the multiple UEs to the set of identifiers when the first received signal power of the UE is greater than a received signal power threshold. The identifier component 199 may further be configured to transmit the set of identifiers to an identifier-receiving UE.

Although the following description may be focused on 5G NR, the herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) wherein for a particular set of subcarriers (carrier system bandwidth), subframes within the set of subcarriers are dedicated for either DL or UL, or may be time division duplex (TDD) wherein for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/negative ACK (NACK) feedback. The PUSCH carries data, and may additionally be used to carry a buffer status report (BSR), a power headroom report (PHR), and/or UCI.

Figure 3:
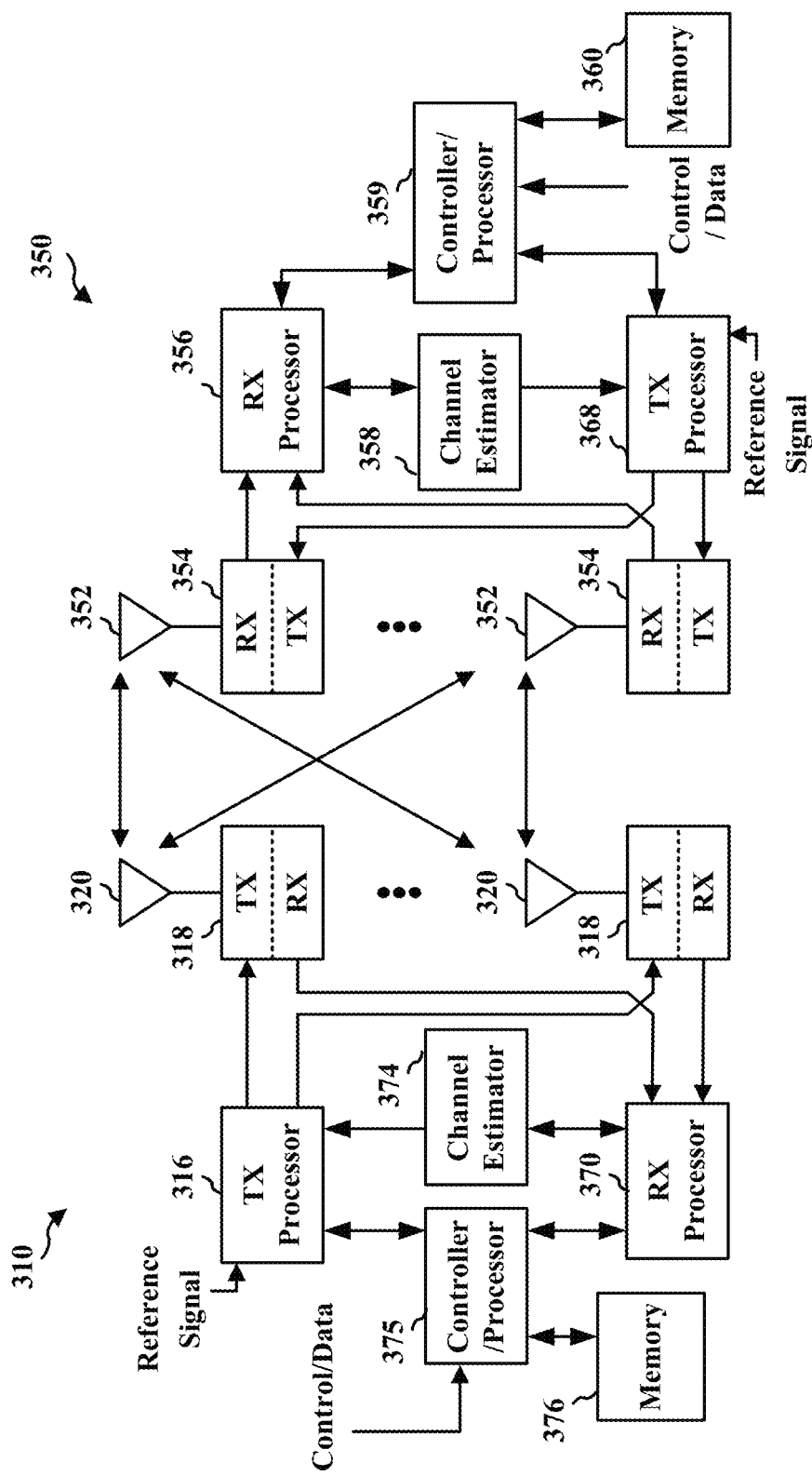
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the resource selecting component 198 and/or identifier component 199 of FIG. 1. Additionally, at least one of the TX processor 316, the RX processor 370, and the controller/processor 375 may be configured to perform aspects in connection with resource selecting component 198 and/or identifier component 199 of FIG. 1.

Figure 4:
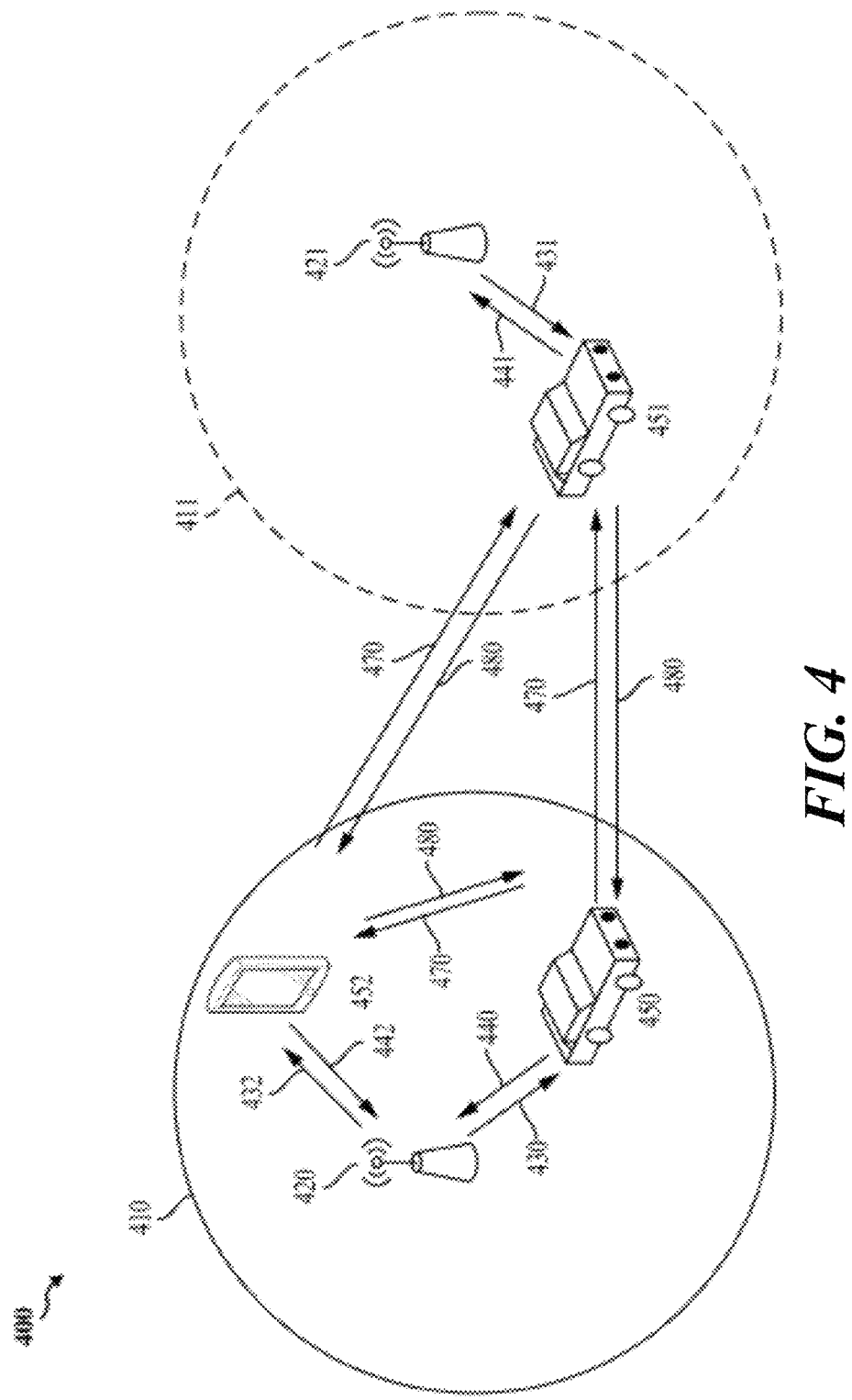
FIGS. 4-5 are diagrams illustrating examples of vehicle-to-everything (V2X) systems, in accordance with various aspects of the present disclosure.

FIG. 4 is a diagram of a device-to-device (D2D) communications system 400, including V2X communication, in accordance with various aspects of the present disclosure. For example, the D2D communications system 400 may include V2X communication, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communication, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more frequency division multiplexed (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452).

Figure 5:
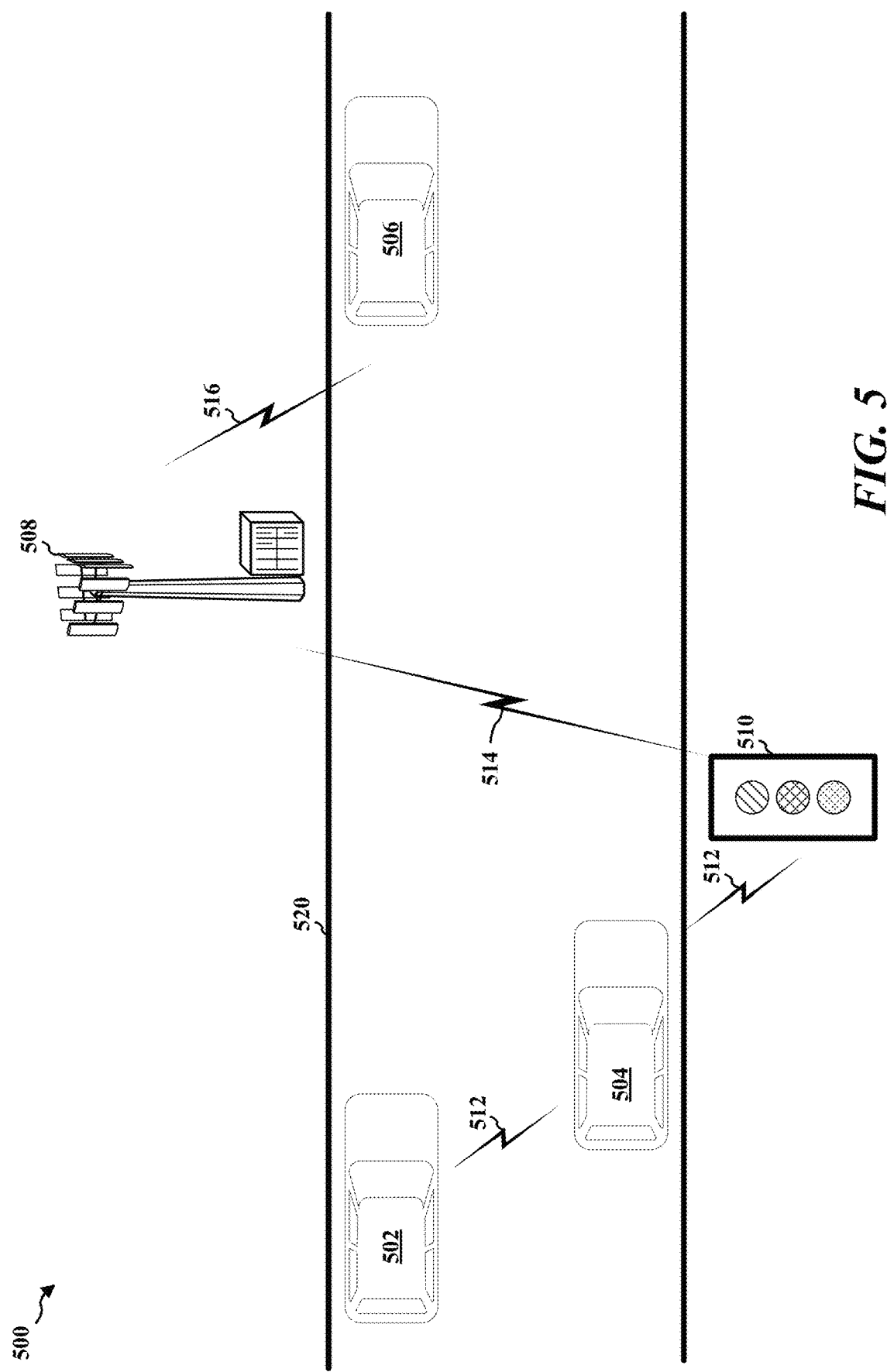

As discussed, a UE may be a vehicle (e.g., UE 450, 451), a mobile device (e.g., 452), or another type of device. In some cases, a UE may be a special UE, such as a road side unit (RSU). FIG. 5 illustrates an example of a V2X system 500 with an RSU 510, according to aspects of the present disclosure. As shown in FIG. 5, a transmitter UE 504 (e.g., transmitter vehicle) transmits data to an RSU 510 and a receiving UE 502 (e.g., receiving vehicle) via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to another UE 506 (e.g., another vehicle) via a DL transmission 516.

The RSU 510 may be incorporated with traffic infrastructure (e.g., traffic light, light pole, etc.) For example, as shown in FIG. 5, the RSU 510 is a traffic signal positioned at a side of a road 520. Additionally, or alternatively, RSUs 510 may be stand-alone units.

As discussed, a UE (e.g., a transmitter UE) may use sensing information provided by other UEs (e.g., receiving UEs or partner UEs) to identify communications resources for sidelink communications (e.g., sidelink transmissions). Accordingly, transmitter UEs may use sensing information obtained by their own measurements as well as sensing information provided by other UEs. Using a combination of sensing information may reduce collisions, such as collisions caused by half duplex and hidden node issues.

To reduce network overhead and to improve throughput, the type of information shared between UEs may be pre-configured. In one configuration, a time window (e.g., milliseconds (ms) or slots) is configured for a UE. The time window may be a future time period. Based on transmissions scheduled during the time window, the UE may be aware of available and unavailable resources (e.g., channels or sub-channels) in the time window. The time window may be configured via signaling (e.g., RRC/SIB) from a base station or pre-configured for out-of-coverage operation. The amount of sensing information shared may correspond to a size of the time window. For example, if a time window is 5 ms, the UE shares information obtained during a 5 ms sensing window.

Figure 6:
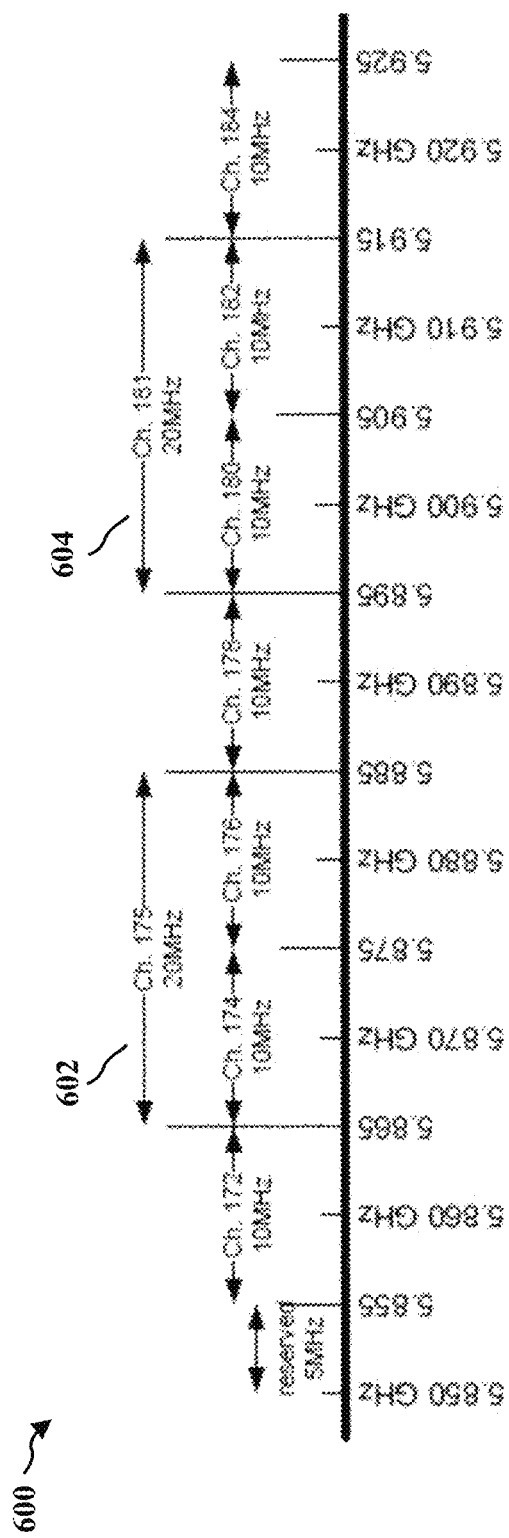
FIG. 6 is a diagram illustrating an example of a radio frequency spectrum, in accordance with various aspects of the present disclosure.

UEs may perform V2X communications via one or more allocated subchannels. FIG. 6 illustrates an example of a radio frequency spectrum 600 with dedicated portions of radio frequency for V2X communications. In this example, the spectrum 600 shows a radio frequency range from 5.850 GHz to 5.925 GHz. The spectrum 600 is not limited to 5.850 GHz to 5.925 GHz.

From the radio frequency spectrum 600, one or more sections may be allocated for V2X communications. As an example, a 20 MHz section 602 (e.g., channel 175) from 5.865 GHz to 5.885 GHz, and another 20 MHz section 604 (e.g., channel 181) from 5.895 GHz to 5.915 GHz may be allocated for V2X communications. Each of the two allocated radio frequency sections 602 and 604 may be divided into multiple subchannels. One or more subchannels may be allocated to UEs for V2X communications. In one example, the allocated radio frequency sections 602 and 604 may be divided into four individual subchannels of 5 MHz each, for the V2X communications.

Specific radio frequency sections that are allocated to V2X communications may be jurisdiction specific. For example, the radio frequency sections 602 and 604 are dedicated frequency resources for V2X communications in the United States. Different radio frequency resources may be dedicated to V2X communications in different jurisdictions.

In one configuration, the sensing information provides per subchannel availability/occupancy in a time window, such as a pre-configured future time window. As discussed, subchannel allocation may be different for each UE. Additionally, a UE may be scheduled for a transmission on one or more subchannels at a future time window. As such, a per subchannel availability for the future time window may be known to the UE. The sensing information may provide resource availability and unavailability on a per subchannel basis for the future time window. The future time window may be configured via control signaling, such as a system information block (SIB) or radio resource control (RRC) signaling, from a base station or pre-configured for out-of-coverage operation. A sidelink UE may schedule one or more transmission resources identified as available in the sensing information shared by another sidelink UE.

Additionally, or alternatively, sensing information may share resource availability for resources from a set of resource pools. In some cases, a subset of the set of resource pools may be configured for sharing. For example, UEs may determine resource availability for resources from different resource pools. In this example, a first resource pool may not be configured for sharing sensing information and a second resource pool may be configured for sharing sensing information. The sharing configuration may be signaled from a base station or pre-configured for out-of-coverage operation.

In some cases, transmissions from a UE, such as uplink transmissions to a base station or sidelink transmissions to another UE, may interfere with transmissions of one or more neighboring UEs. For example, a sidelink transmission from a first UE to a second UE may collide with other transmissions to and/or from the second UE. Aspects of the present disclosure are not limited to the described collisions; other types of interference, such as half-duplex interference, are considered. To mitigate interference, sidelink UEs may share interference avoidance information. Aspects of the present disclosure are directed to sharing interference avoidance information between UEs that support autonomous resource selection, such as UEs operating in sidelink mode 2.

In one configuration, an identifier-transmitting (Tx) UE receives transmissions from one or more resource UEs. A resource UE may be an example of a UE that reserves one or more sidelink resources. A resource-sharing UE may be an example of a resource UE. From the received transmissions, the identifier-transmitting UE identifies resource UEs with a received signal power greater than a received signal power threshold (e.g., identifier-Tx UE received signal power threshold). In some examples, the resource UEs located closer to the identifier-Tx UE have a higher received signal power in comparison to resource UEs located further from the identifier-Tx UE. In such examples, a resource UE located near the identifier-Tx UE may be located further away from an identifier-Rx UE, such that a received signal power of the resource UE may not satisfy a condition at the identifier-Rx UE. For example, the received signal power may be less than a first identifier-Rx UE received signal power threshold. Still, the identifier-Rx UE may attempt to use one or more resource of the resource UE, thereby causing a potential conflict with transmissions at the identifier-Tx UE. Therefore, the identifier-Tx UE may indicate one or more identifiers to the identifier-RX UE to reduce a likelihood of a conflict. In some examples, the identifier-RX UE excludes resources of a resource UE associated with one of the indicated identifiers. In other examples, the identifier-RX UE may apply a second identifier-Rx UE received signal power threshold to the resource UE associated with one of the indicated identifiers. The second identifier-Rx UE received signal power threshold may be greater than the first identifier-Rx UE received signal power threshold. In such examples, the identifier-RX UE may use resources, such as transmission resources of the resource UE if the resource UE's received signal power is greater than the second identifier-Rx UE received signal power threshold.

As described, in some implementations, the identifier-Tx UE may generate a set of identifiers including one or more identifiers. Each respective identifier in the set corresponds to a resource UE with a received signal power greater than the identifier-Tx UE received signal power threshold. The set of identifiers may include layer one (LI) ID and/or layer two (L2) ID. An ID, such as an L1 ID, may be an example of an identifier. For ease of explanation, ID may be used interchangeably with identifier. L1 and/or L2 IDs may be identified from packets transmitted by a resource UE. The identifier-Tx UE distinguishes received packets based on the L1 and/or L2 IDs. The L1 and/or L2 IDs may be provided in a medium access control (MAC) header and/or control information.

As an example, a resource UE uses a twenty-four bit ID for unicast, multicast, and/or broadcast communications. A portion of the ID may be included in physical layer control information. The portion included in the physical layer control information may be referred to as the L1 identifier. The remaining portion may be in a MAC header. The portion in the MAC header may be referred to as the L2 identifier. As an example, sixteen bits of the identifier may be in the control information, and eight bits may be in the MAC header. The identifier may be a source identifier associated with a transmission source of a packet. Alternatively, the identifier may be a destination identifier associated with an intended destination (e.g., receiver) of a transmitted packet.

The identifier-Tx UE may transmit the set of identifiers to an identifier-receiving (Rx) UE via a sidelink transmission (e.g., V2X transmission), or another type of peer-to-peer transmission. The identifier-Rx UE may receive the list. The set of identifiers may be transmitted in addition to, or separate from, sensing information. In one implementation, the set of identifiers may be periodically transmitted by the identifier-Tx UE (and periodically received by the identifier-Rx UE) with a pre-determined periodicity, such as once every x ms. Additionally, or alternatively, the set of identifiers may be transmitted by the identifier-Tx UE in response to an event, such as a change in detected IDs. That is, the identifier-Rx UE may receive the list due to the identifier-Tx UE being triggered by the event. The set of identifiers may be provided in a MAC control element (CE), RRC signaling, or sidelink control information (SCI) (e.g., SCI stage 2).

The identifier-Rx UE may determine whether transmission resources of one or more resource UEs are available or unavailable based on the received set of identifiers. For example, transmission resources of a resource UE may be available to the identifier-Rx UE if the resource UE is excluded from the set of identifiers. As another example, transmission resources of a resource UE may not be available to the identifier-Rx UE if the resource UE is included in the set of identifiers. Additionally, the identifier-Rx UE may determine whether transmission resources of one or more resource UEs are available or unavailable based on sensing information received from multiple resource UEs. The received sensing information identifies current and/or future resources scheduled by the resource UE. For example, the identifier-Rx UE identifies available and unavailable resources for future transmissions based on the sensing information received from one or more resource UEs. In another example, the identifier-RX UE may apply an increased identifier-Rx UE received signal power threshold to a resource UE associated with one identifier of the received set of identifiers. In such an example, the identifier-RX UE may use transmission resources of the resource UE associated with the identifier in the received set of identifiers if the received signal power of the resource UE is greater than the increased identifier-Rx UE received signal power threshold.

Given a limited number of resources available for sidelink transmissions, the identifier-Rx UE may not find an available resource for a future transmission. A resource available for future transmission may be referred to as a clean resource. In some examples, to prevent transmission delays, the identifier-Rx UE may re-use one or more resources indicated as unavailable by a resource UE. As described, a resource may be unavailable if the resource is scheduled for a future transmission by a sharing UE.

Still, re-using resources my cause interference, as both the identifier-Rx UE and the resource UE may be transmitting data or control information on a same subchannel. To mitigate interference, the identifier-Rx UE identifies candidate resources for re-use by establishing an identifier-Rx received signal power threshold. In one configuration, the identifier-Rx UE measures the received signal power of one or more resource UEs. The identifier-Rx UE excludes resources of a resource UE when the resource UE's received signal power (e.g., reference signal received power (RSRP)) is greater than the identifier-Rx UE received signal power threshold. Excluded resources may not be re-used. Additionally, if the received signal power of the resource UE is less than the identifier-Rx received signal power threshold, the resource UE may be a candidate for resource re-use.

In addition to, or alternate from, excluding resources based on the identifier-Rx received signal power threshold, the identifier-Rx UE may exclude resources of resource UEs included on a set of identifiers received from the identifier-Tx UE. That is, as described, the identifier-Rx UE may re-use transmission resources of a resource UE if the resource UE is not included in the set of identifiers received from the identifier-Tx UE and if the received signal power measured by the identifier-Rx UE is less than the identifier-Rx received signal power threshold. Additionally, the identifier-Rx UE may not re-use transmission resources of a resource UE if the resource UE is included in the set of identifiers received from the identifier-Tx UE and/or if the received signal power measured by the identifier-Rx UE is greater than the identifier-Rx received signal power threshold. The identifier-Tx received signal power threshold may be less than the identifier-Rx received signal power threshold.

Figure 7:
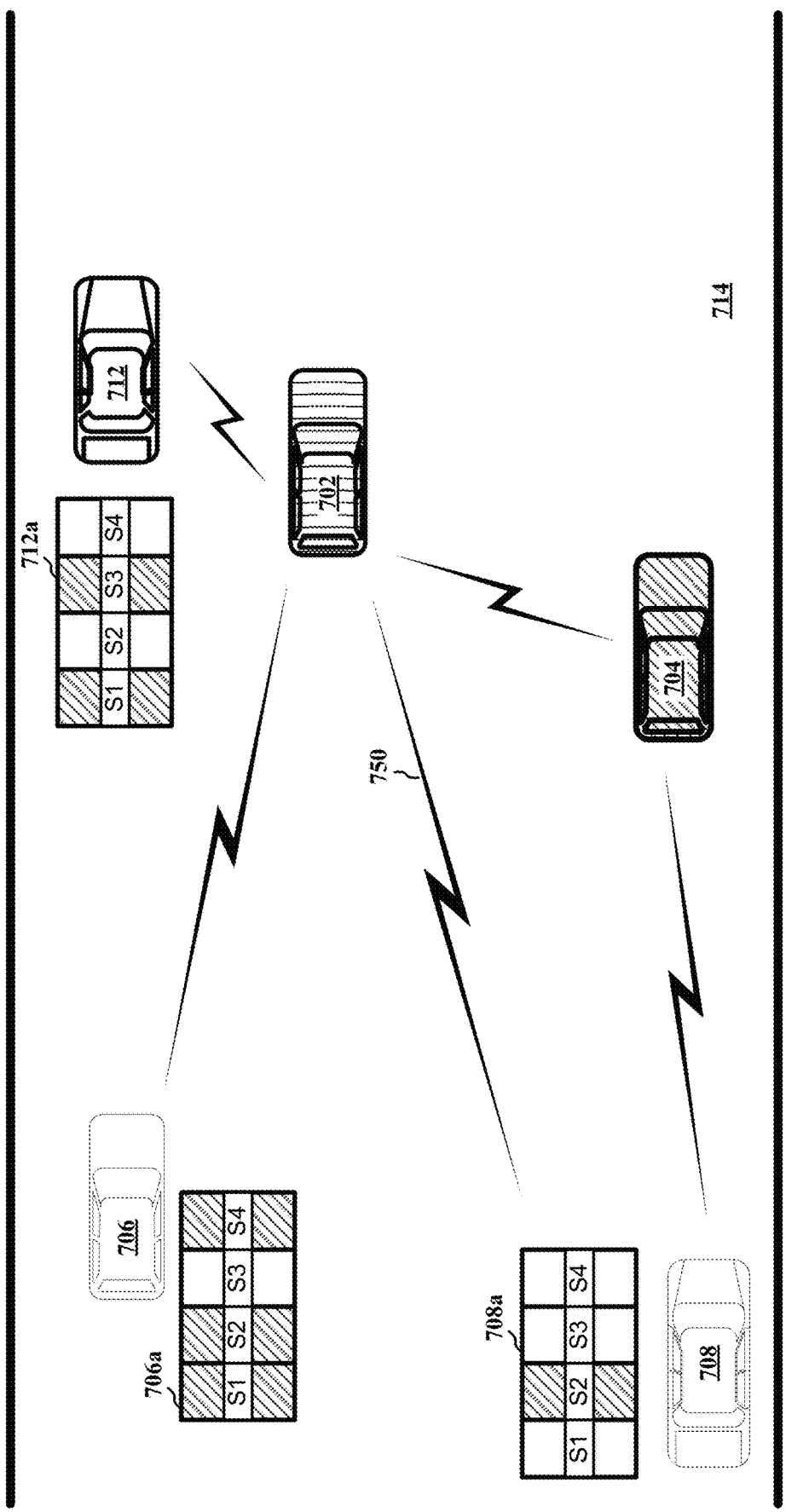
FIG. 7 is a diagram illustrating an example of resource allocation, in accordance with various aspects of the present disclosure.

FIG. 7 is a diagram illustrating an example of resource allocation, according to aspects of the present disclosure. In the illustrated example of FIG. 7, multiple UEs 702, 704, 706, 708, 712 are capable of communicating via sidelink transmissions 750, or sidelink transmissions 512 described with reference to FIG. 5, using a number of resources, such as the D2D resources. The sidelink transmissions 750 may be carried over sidelink channels, such as the sidelink carriers 470, 480 described with reference to FIG. 4. Each UE 702, 704, 706, 708, 712 may be identified with a unique ID. In the example of FIG. 7, the UEs 702, 704, 706, 708, 712 are shown as vehicles, such as the UEs 450 and 451 as described with reference to FIG. 4. Still, one or more of the UEs 702, 704, 706, 708, 712 may be a mobile device 452 as described in FIG. 4, an RSU 510 as described in FIG. 5, or another type of communication device.

In the illustrated example of FIG. 7, an identifier-receiving (Rx) UE 702 traveling on a road 714 is in communication with an identifier-transmitting (Tx) UE 704. The identifier-Rx UE 702 may measure a received signal strength (e.g., RSRP) of a first resource UE 706, second resource UE 708, and third resource UE 712. Additionally, the first resource UE 706, second resource UE 708, and third resource UE 712 may share respective sensing information 706a, 708a, 712a with the identifier-Rx UE 702. The resource UEs 706, 708, 712 may also be referred to as partner UEs, such as the UE 451 described in reference to FIG. 4.

The shared sensing information 706a, 708a, 712a indicates the available and unavailable resources (e.g., subbands S1, S2, S3, and S4) of the first resource UE 706, second resource UE 708, and third resource UE 712. For example, the sensing information 712a of the third resource UE 712 indicates that the first (S1) and third (S3) subbands are unavailable (e.g., used) and the second (S2) and fourth (S4) subbands are available (e.g., unused) during the sensing period. As discussed, the sensing information provides future resource availability. Aspects of the present disclosure are not limited to sharing sensing information for four subbands S1-S4. The subbands S1-S4 shown in FIG. 7 are provided for exemplary purposes.

In one configuration, to mitigate interference, the identifier-Rx UE 702 establishes a received power threshold (e.g., identifier-Rx UE received power threshold). The identifier-Rx UE 702 may identify resources for re-use based on the received power threshold. In one configuration, the identifier-Rx UE 702 excludes unavailable resources of a neighboring UE 706, 708, 712 from re-use consideration when the signal strength (e.g., RSRP) of the neighboring UE 706, 708, 712 is greater than the identifier-Rx UE received power threshold.

For exemplary purposes, it is assumed the signal strengths of the third and second resource UEs 706, 708, measured at the identifier-Rx UE 702, are less than the identifier-Rx UE received power threshold. Additionally, the signal strength of the third resource UE 712, measured at the identifier-Rx UE 702, is greater than the identifier-Rx UE received power threshold. In this example, transmissions by the identifier-Rx UE 702 on re-used resources of the third resource UE 712 would experience more interference in comparison to interference experienced on re-used resources of the first and second resource UEs 706, 708. Thus, in the current example, when selecting future resources, the identifier-Rx UE 702 excludes the resources (e.g., S1 and S3) used by third resource UE's 712 from re-use consideration (e.g., for a future transmission) because the third resource UE's 712 signal strength is greater than the second UE received power threshold. Because at least one resource of the third resource UE 712 is excluded, the third resource UE 712 may be referred to as an excluded UE. Still, the resources that are not used by the third resource UE 712 (e.g., the second (S2) and fourth (S4) resources) may be candidates for future transmissions by the identifier-Rx UE 702.

In one configuration, the identifier-Tx UE 704 also establishes a received power threshold (e.g., identifier-Tx received signal power threshold) for selecting future resources. In the example of FIG. 7, the identifier-Tx UE 704 measures the received signal power of the resource UEs 706, 708, 712 and identifies each resource UE 706, 708, 712 with a received signal power that is greater than the identifier-Tx received signal power threshold. The identifier-Tx UE 704 generates a set of identifiers of L1 IDs or L2 IDs corresponding to the one or more resource UEs 706, 708, 712 with the received signal power that is greater than the received signal power threshold. As described, the identifier-Tx received signal power threshold may be different from the identifier-Rx received signal power threshold.

For exemplary purposes, it is assumed the received signal power of the first and third resource UEs 706, 712, measured at the identifier-Tx UE 704, are less than the identifier-Tx received power threshold. Additionally, the received signal power of the second resource UE 708, measured at the identifier-Tx UE 704, is greater than the identifier-Tx received power threshold. Because the received signal power of the second resource UE 708 is greater than the identifier-Tx received signal power threshold, the identifier-Tx UE 704 adds the L1 or L2 ID of the second resource UE 708 to a set of identifiers.

The identifier-Tx UE 704 transmits the set of identifiers to the identifier-Rx UE 702 via a V2X transmission or another type of peer-to-peer transmission (e.g., vehicle-to-vehicle (V2V) transmission). According to aspects of the present disclosure, the identifier-Rx UE 702 may exclude a resource UE 706, 708, 712 as a resource candidate if an ID of the resource UE 706, 708, 712 is included in the set of identifiers. Based on the received set of identifiers, the identifier-Rx UE 702 determines that the second resource UE's received signal power is greater than the identifier-Tx received power threshold. Therefore, the identifier-Rx UE 702 also excludes at least one resource (e.g., S2) used by the second resource UE 708 from re-use consideration. Additionally, because at least one resource of the second resource UE 708 is excluded, the second resource UE 708 may be referred to as an excluded UE.

That is, in the example of FIG. 7, the identifier-Rx UE 702 excludes the first through third resources (S1-S3) for a future transmission. As described above, the second resource (S2) may be excluded because the second resource (S2) is used by the second resource UE 708, which is included on the set of identifiers received from the identifier-Tx UE 704. The first and third resources (S1 and S3) may also be excluded because the first and third resources (S1 and S3) are used by the third resource UE 712, which has a received signal power greater than the identifier-Rx UE received signal power threshold. In this example, the fourth resource (S4) is not excluded from re-use because the fourth resource (S4) is not used by either the second or third resource UEs 708, 712. That is, the fourth resource (S4) may be a candidate for a future transmission.

As shown in FIG. 7, the fourth resource (S4) is used by the first resource UE 706. Still, the received signal power of the first resource UE 706 is less than the received signal power thresholds of the identifier-Rx UE 702 and the identifier-Tx UE 704. Thus, the identifier-Rx UE 702 may re-use one or more resources used by the first resource UE 706. That is, the identifier-Rx UE 702 may re-use the fourth resource (S4) for a future transmission. In one configuration, if the identifier-Rx UE 702 does not find any free resources, the identifier-Rx UE 702 may adjust one or more of the first and second thresholds.

The identifier-Tx UE 704 may also share sensing information with the identifier-Rx UE 702. The identifier-Rx UE 702 may consider the identifier-Tx UE resource use when scheduling transmissions.

As indicated above, FIGS. 5-7 are provided as examples. Other examples may differ from what is described with respect to FIGS. 5-7.

Figure 8:
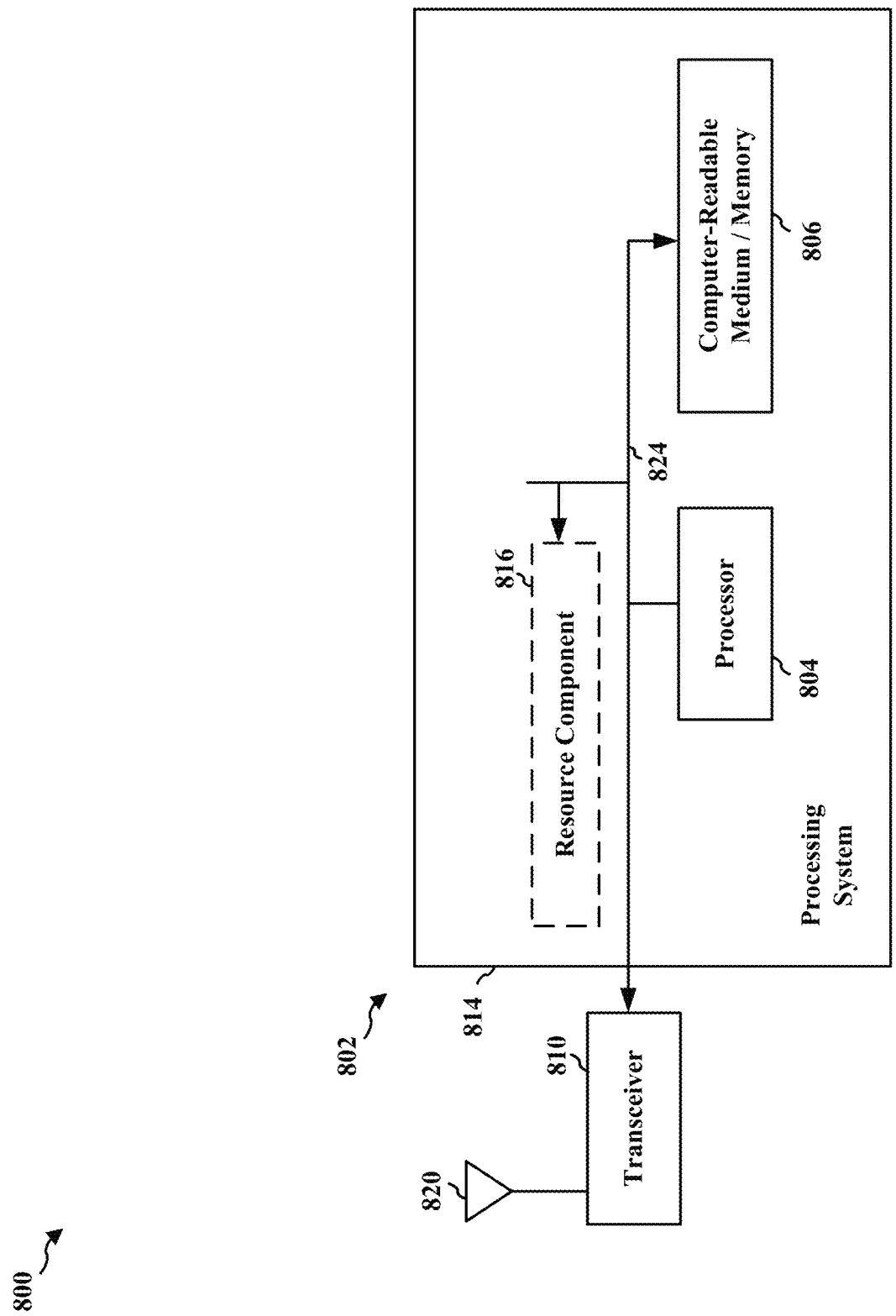
FIG. 8 is a diagram illustrating an example of a hardware implementation for an apparatus employing a processing system, in accordance with various aspects of the present disclosure.

FIG. 8 is a diagram 800 illustrating an example of a hardware implementation for an apparatus 802 employing a processing system 814. The processing system 814 may be implemented with a bus architecture, represented generally by a bus 824. The bus 824 may include any number of interconnecting buses and bridges depending on the specific application of the processing system 814 and the overall design constraints. The bus 824 links together various circuits including one or more processors and/or hardware components, represented by a processor 804, a resource component 816, and a computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810 (which can be one example of and/or include MOD/DEMOD 354 with reference to FIG. 3). The transceiver 810 is coupled to one or more antennas 820 (which can be one example of and/or include antenna 352 with reference to FIG. 3). The transceiver 810 provides a means for communicating with various other apparatus over a transmission medium. The transceiver 810 receives a signal from the one or more antennas 820, extracts information from the received signal, and provides the extracted information to the processing system 814. In addition, the transceiver 810 receives information from the processing system 814 and based on the received information, generates a signal to be applied to the one or more antennas 820. The transceiver 810 receives sensing information transmitted from one or more partner UEs, such as the resource UEs 706, 708, 712 as described in FIG. 7. The sensing information may be transmitted via a sidelink transmission, such as the sidelink transmission 750 as described in FIG. 7.

The processing system 814 includes at least one processor 804 (which can be one example of and/or include RX processor 356, channel estimator 358, TX processor 368, and/or controller/processor 359, or any combination thereof with reference to FIG. 3) coupled to a computer-readable medium/memory 806 (which can be one example of and/or include memory 360 with reference to FIG. 3). The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software.

The processing system 814 further includes at least the resource component 816. In some implementations, the resource component 816 may be a component of an identifier-receiving UE, such as the identifier-receiving UE 702 as described in FIG. 7. In some such implementations, the resource component 816 can be configured to identify one or more resources used by one or more resource UEs, such as the resource UEs 708, 710, 712 as described in FIG. 7, for a future transmission based on received signal power measurements and/or a set of identifiers received from an identifier-transmission UE, such as the identifier-transmission UE 708 as described in FIG. 7. In such implementations, working in conjunction with the antenna 820, the transceiver 810, and/or the processor 804, the resource component 816 can be configured to measure a received signal power of multiple resource UEs. Additionally, working in conjunction with the antenna 820 and/or the transceiver 810, the resource component 816 can be configured to receive a set of identifiers from the identifier transmission UE. Additionally, working in conjunction with the processor 804, the resource component 816 may be configured to identify a resource used by one or more of the multiple resource UEs for a future transmission based on the measured received signal power and the received set of identifiers. Furthermore, working in conjunction with the antenna 820, the transceiver 810, and/or the processor 804, the resource component 816 may be configured to schedule the future transmission on the at least one identified resource.

In additional, or alternate, implementations, the resource component 816 may be a component of an identifier-transmitting UE, such as the identifier-transmitting UE 704 as described with reference to FIG. 7. In such implementations, working in conjunction with the antenna 820, the transceiver 810, and/or the processor 804, the resource component 816 may be configured to measure a received signal power of multiple resource UEs. Additionally, working in conjunction with the processor 804, the resource component 816 may be configured to generate a set of identifiers by adding a resource UE of the multiple resource UEs to the set of identifiers when the measured received signal power of the resource UE is greater than an identifier-transmitting UE received signal power threshold. Furthermore, working in conjunction with the antenna 820 and/or the transceiver 810, the resource component 816 may be configured to transmit the set of identifiers to an identifier-receiving UE.

The component may be software a component running in the processor 804, resident/stored in the computer readable medium/memory 806, one or more hardware components coupled to the processor 804, or some combination thereof. The processing system 814 may be a component of the base station 310 and may include the memory 376 and/or at least one of the TX processor 316, the RX processor 380, and the controller/processor 375. Alternatively, the processing system 814 may be the entire base station (e.g., see base station 310 of FIG. 3). The processing system 814 may be a component of the UE 350 and may include the memory 360 and/or at least one of the TX processor 368, the RX processor 356, and the controller/processor 359. Alternatively, the processing system 814 may be the entire UE (e.g., see UE 350 of FIG. 3).

In one configuration, the apparatus 802 for wireless communications includes means measuring a first received signal power of multiple UEs (e.g., antenna 820, transceiver 810, processor 804, computer-readable medium 806, and/or the like); means for receiving a set of identifiers from a identifier-Tx (e.g., antenna 820, transceiver 810, processor 804, computer-readable medium 806, and/or the like); means for identifying a resource of a second UE from the multiple UEs for a future transmission based on the first received signal power and the received set of identifiers (e.g., resource component 816, processor 804, computer-readable medium 806, and/or the like); and/or means for scheduling the future transmission on at least one identified resource (e.g., transceiver 810, processor 804, resource component 816, and/or the like). Additionally, or alternatively, the apparatus 802 for wireless communications includes means for measuring a first received signal power of multiple UEs (e.g., antenna 820, transceiver 810, processor 804, computer-readable medium 806, and/or the like); means for generating a set of identifiers by adding each UE of the multiple UEs to the set of identifiers when the first received signal power of the UE is greater than a received signal power threshold (e.g., transceiver 810, processor 804, computer-readable medium 806, and/or the like); and/or means for transmitting the set of identifiers to an identifier-Rx UE (e.g., antenna 820, transceiver 810, processor 804, computer-readable medium 806, and/or the like).

The aforementioned means may be one or more of the aforementioned components of the processing system 814 configured to perform the functions recited by the aforementioned means. As described supra, the processing system 814 may include the TX processor 316, the RX processor 380, and the controller/processor 375. As such, in one configuration, the aforementioned means may be the TX processor 316, the RX processor 380, and the controller/processor 375 configured to perform the functions recited by the aforementioned means. The aforementioned means may be one or more of the aforementioned components of the processing system 814 configured to perform the functions recited by the aforementioned means. As described supra, the processing system 814 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 9:
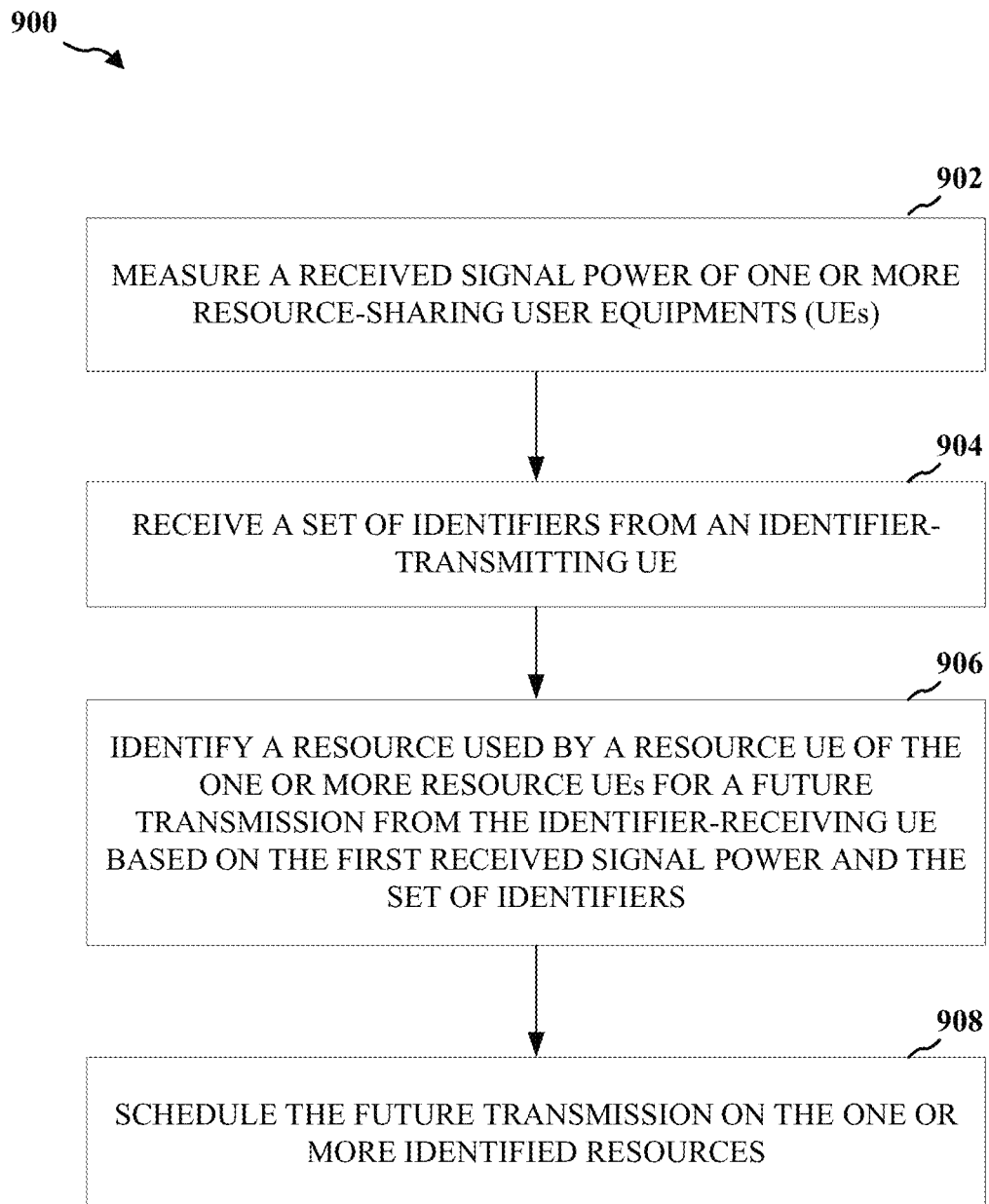
FIG. 9 is a diagram illustrating an example process performed, for example, by a UE, in accordance with various aspects of the present disclosure.

FIG. 9 is a diagram illustrating an example process 900 performed, for example, by an identifier-receiving UE, in accordance with various aspects of the present disclosure. The example process 900 is an example of new radio (NR) vehicle-to-everything (V2X) destination identification sharing for inter-UE coordination.

As shown in FIG. 9, in some aspects, the process 900 may include measuring a received signal power of one or more resource UEs (block 902). For example, the identifier-receiving UE (e.g., using the controller/processor 359, memory 360, and/or the like) can measure a received signal power of the one or more resource UEs. In one example, with reference to FIG. 7, the identifier-receiving UE can correspond to the identifier-receiving UE 702 and the UEs can correspond to the first resource UE 706, second resource UE 708, and third resource UE 712.

As shown in FIG. 9, in some aspects, the process 900 may include receiving a set of identifiers from an identifier-transmitting UE (block 904). For example, the identifier-receiving UE (e.g., using the antenna 352, RX 354, RX processor 356, controller/processor 359, memory 360, and/or the like) can receive the set of identifiers from the identifier-transmitting UE. In one example, with reference to FIG. 7, the identifier-transmitting UE can correspond to the identifier-transmitting UE 704.

As shown in FIG. 9, in some aspects, the process 900 may include identifying a resource used by a resource UE of the one or more resource UEs for a future transmission based on the measured received signal power and the received set of identifiers (block 906). For example, the identifier-receiving UE (e.g., using the controller/processor 359, memory 360, and/or the like) can identify a resource used by a resource UE of the one or more resource UEs for a future transmission based on the measured received signal power and the received set of identifiers. In one example, with reference to FIG. 7, the at least one resource used by at least one of the resource UEs 706, 708, 712 can correspond to at least one subband S1-S4.

In some implementations, a resource used by one or more resource UEs may be excluded for the future transmission based on the measured received signal power and/or the received set of identifiers. In such implementations, the resource may be excluded if the received signal power of a resource UE, as measured at the identifier-receiving UE, is greater than an identifier-receiving UE received signal power threshold and/or if a layer one (L1) or layer two (L2) ID of the resource UE is included in the received set of identifiers. For ease of explanation, a resource UE may be referred to as an excluded UE if one or more used resources of the resource UE are excluded from use.

As shown in FIG. 9, in some aspects, the process 900 may include scheduling the future transmission on the one or more identified resources (block 908). For example, the UE (e.g., using the controller/processor 359, memory 360, and/or the like) can schedule the future transmission on at least one identified resource.

Figure 10:
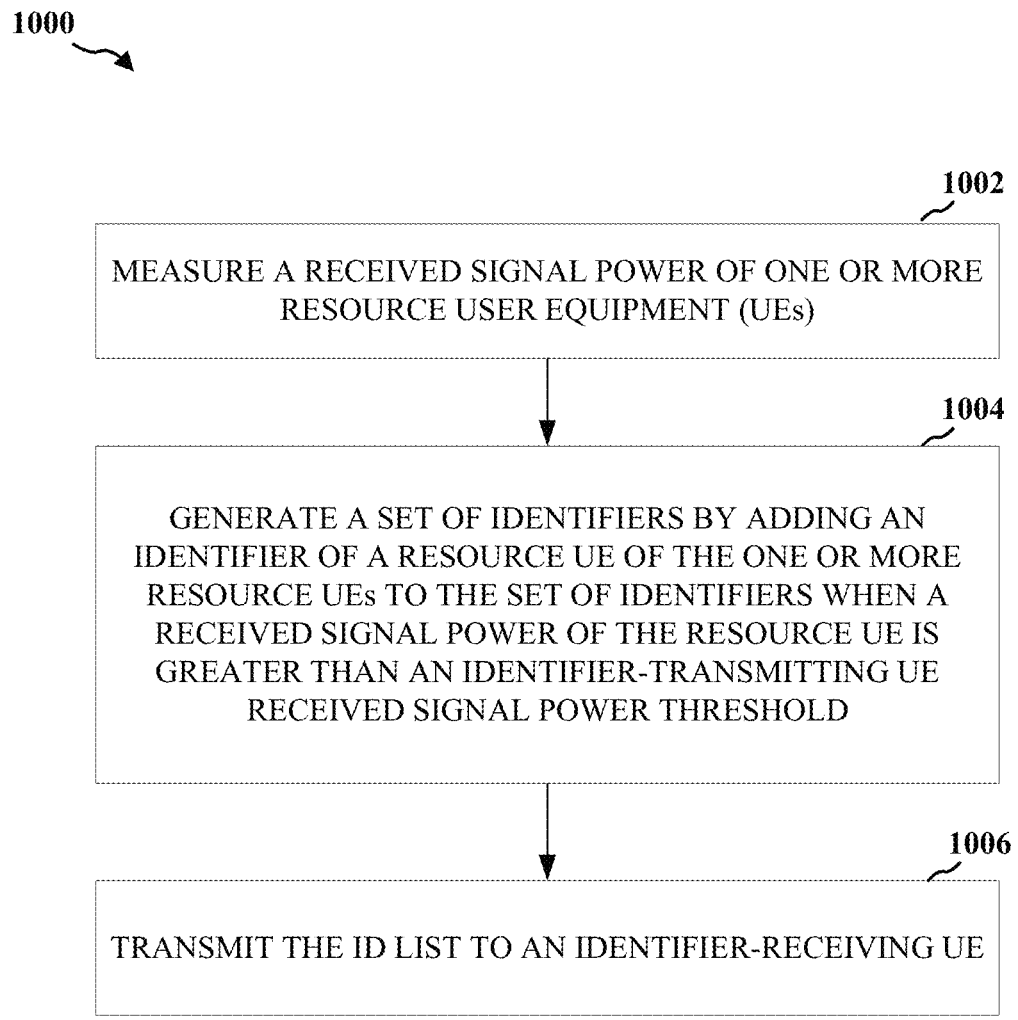
FIG. 10 is a diagram illustrating an example process performed, for example, by a UE, in accordance with various aspects of the present disclosure.

FIG. 10 is a diagram illustrating an example process 1000 performed, for example, by an identifier-transmitting UE, in accordance with various aspects of the present disclosure. The example process 1000 is an example of NR V2X destination identification sharing for inter-UE coordination.

As shown in FIG. 10, in some aspects, the process 1000 may include measuring a received signal power of one or more resource UEs (block 1002). For example, the identifier-transmitting UE (e.g., using the controller/processor 359, memory 360, and/or the like) can measure a first received signal power of one or more resource UEs. In one example, with reference to FIG. 7, the identifier-transmitting UE can correspond to the identifier-transmitting UE 704 and the resource UEs can correspond to the first resource UE 706, second resource UE 708, and third resource UE 712.

As shown in FIG. 10, in some aspects, the process 1000 may include generating a set of identifiers by adding each resource UE of the one or more resource UEs to the set of identifiers when the measured received signal power of the resource UE is greater than an identifier-transmitting UE received signal power threshold (block 1004). For example, the identifier-transmitting UE (e.g., using the controller/processor 359, memory 360, and/or the like) can generate a set of identifiers by adding a resource UE of the one or more resource UEs to the set of identifiers when the measured received signal power of the resource UE is greater than a received signal power threshold. In one example, with reference to FIG. 7, the resource UEs of the resource UEs added to the set of identifiers can include the first resource UE 706, second resource UE 708, and third resource UE 712.

As shown in FIG. 10, in some aspects, the process 1000 may include transmitting the set of identifiers to an identifier-receiving UE (block 1006). For example, the identifier-transmitting UE (e.g., using the antenna 352, TX 354, TX processor 368, controller/processor 359, memory 360, and/or the like) can transmit the set of identifiers to the identifier-receiving UE. In one example, with reference to FIG. 7, the identifier-receiving UE of FIG. 10 can correspond to the identifier-receiving UE 702 of FIG. 7.

Implementation examples are described in the following numbered clauses:

1. A method of wireless communications, comprising: measuring a first received signal power of a plurality of resource UEs; receiving a set of identifiers from an identifier-transmitting UE; identifying at least one resource used by at least one resource UE of the plurality of resource UEs for a future transmission by an identifier-receiving UE based on the first received signal power and the set of identifiers; and scheduling the future transmission on the at least one identified resource.

2. The method of Clause 1, wherein: each respective identifier of the set of identifiers corresponds to a resource UE from the plurality of resource UEs, each respective resource UE of the plurality of resource UEs having reserved one or more resources; and a second received signal power of each respective resource UE corresponding a respective identifier of the set of identifiers being greater than an identifier-transmitting UE received signal power threshold.

3. The method of any of Clauses 1-2, further comprising identifying the at least one resource when the first received signal power of the at least one resource UE is less than an identifier-receiving UE received signal power threshold, and a L1 identifier or L2 identifier of the at least one resource UE is excluded from the set of identifiers.

4. The method of any of Clauses 1-3, further comprising excluding at least one resource used by at least one excluded UE of the plurality of resource UEs for the future transmission based on at least one of the first received signal power and the set of identifiers.

5. The method of Clause 4, further comprising excluding the at least one resource used by the at least one excluded UE when the first received signal power of the at least one excluded UE is greater than an identifier-receiving UE received signal power threshold, or a L1 identifier or L2 identifier of the at least one excluded UE is included in the set of identifiers.

6. The method of Clause 5, wherein the at least one excluded resource is scheduled for a transmission by the at least one excluded UE.

7. A method for wireless communications, comprising: measuring a received signal power of a plurality of resource UEs; generating a set of identifiers by adding an identifier of a resource UE of the plurality of resource UEs to the set of identifiers when a received signal power of the resource UE is greater than an identifier-transmitting UE received signal power threshold; and transmitting the set of identifiers to an identifier-receiving UE.

8. The method of Clause 7, further comprising generating the set of identifiers by adding a L1 identifier or L2 identifier of the resource UE.

9. The method of any of Clauses 7-8, further comprising periodically transmitting the set of identifiers at a pre-determined periodicity or in response to an event.

10. The method of Clause 9, wherein the event comprises a change in detected identifiers, each of the plurality of resource UEs having a different identifier.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by an identifier-receiving user equipment (UE), comprising:
    measuring a respective first received signal power of each resource UE of a plurality of resource UEs;
    receiving a set of identifiers from an identifier-transmitting UE;
    identifying at least one resource used by at least one resource UE of the plurality of resource UEs for a future transmission from the identifier-receiving UE based on the respective first received signal power and a layer one (L1) identifier or layer 2 (L2) identifier of the at least one resource UE being excluded from the set of identifiers; and
    scheduling the future transmission on the at least one identified resource.

2. The method of claim 1, wherein:
    each identifier of the set of identifiers corresponds to a respective resource UE from the plurality of resource UEs, each resource UE of the plurality of resource UEs having reserved one or more resources; and
    a second received signal power of each resource UE corresponding to a respective identifier of the set of identifiers being greater than an identifier-transmitting UE received signal power threshold.

3. The method of claim 1, further comprising identifying the at least one resource when the respective first received signal power of the at least one resource UE is less than an identifier-receiving UE received signal power threshold.

4. The method of claim 1, further comprising excluding at least one resource used by at least one excluded UE of the plurality of resource UEs for the future transmission based on at least one of the respective first received signal power or the set of identifiers.

5. The method of claim 4, further comprising excluding the at least one resource used by the at least one excluded UE when the respective first received signal power of the at least one excluded UE is greater than an identifier-receiving UE received signal power threshold, or a layer one (L1) identifier or layer two (L2) identifier of the at least one excluded UE is included in the set of identifiers.

6. The method of claim 5, wherein the at least one excluded resource is scheduled for a transmission by the at least one excluded UE.

7. An apparatus for wireless communication at an identifier-receiving user equipment (UE), comprising:
    a processor;
    a memory coupled with the processor; and
    instructions stored in the memory and operable, when executed by the processor, to cause the apparatus to:
        measure a respective first received signal power of each resource UE of a plurality of resource UEs;
        receive a set of identifiers from an identifier-transmitting UE;
        identify at least one resource used by at least one resource UE of the plurality of resource UEs for a future transmission from the identifier-receiving UE based on the respective first received signal power and a layer one (L1) identifier or layer 2 (L2) identifier of the at least one resource UE being excluded from the set of identifiers; and
        schedule the future transmission on the at least one identified resource.

8. The apparatus of claim 7, wherein:
    each identifier of the set of identifiers corresponds to a respective resource UE from the plurality of resource UEs, each resource UE of the plurality of resource UEs having reserved one or more resources; and
    a second received signal power of each resource UE corresponding to a respective identifier of the set of identifiers being greater than an identifier-transmitting UE received signal power threshold.

9. The apparatus of claim 7, wherein execution of the instructions further cause the apparatus to identify the at least one resource when the respective first received signal power of the at least one resource UE is less than an identifier-receiving UE received signal power threshold.

10. The apparatus of claim 7, wherein execution of the instructions further cause the apparatus to exclude at least one resource used by at least one excluded UE of the plurality of resource UEs for the future transmission based on at least one of the respective first received signal power or the set of identifiers.

11. The apparatus of claim 10, wherein execution of the instructions further cause the apparatus to exclude the at least one resource used by the at least one excluded UE when the respective first received signal power of the at least one excluded UE is greater than an identifier-receiving UE received signal power threshold, or a layer one (L1) identifier or layer two (L2) identifier of the at least one excluded UE is included in the set of identifiers.

12. The apparatus of claim 11, wherein the at least one excluded resource is scheduled for a transmission by the at least one excluded UE.

13. A method for wireless communication by an identifier-transmitting user equipment (UE), comprising:
    measuring a respective received signal power of each resource UE of a plurality of resource UEs;
    generating a set of identifiers by adding a respective identifier of each resource UE of the plurality of resource UEs, to the set of identifiers, based on the respective received signal power being greater than an identifier-transmitting UE received signal power threshold; and
    transmitting the set of identifiers to an identifier-receiving UE.

14. The method of claim 13, further comprising generating the set of identifiers by adding a layer one (L1) identifier or layer two (L2) identifier of the resource UE.

15. The method of claim 13, further comprising periodically transmitting the set of identifiers at a pre-determined periodicity or in response to an event.

16. The method of claim 15, wherein the event comprises a change in detected identifiers, each of the plurality of resource UEs having a different identifier.

17. An apparatus for wireless communication at an identifier-transmitting user equipment (UE), comprising:
    a processor;
    a memory coupled with the processor; and
    instructions stored in the memory and operable, when executed by the processor, to cause the apparatus to:
        measure a respective received signal power of each resource UE of a plurality of resource;
        generate a set of identifiers by adding a respective identifier of each resource UE of the plurality of resource UEs, to the set of identifiers, based on the respective received signal power being greater than an identifier-transmitting UE received signal power threshold; and
        transmit the set of identifiers to a identifier-receiving UE.

18. The apparatus of claim 17, wherein execution of the instructions further cause the apparatus to generate the set of identifiers by adding a layer one (L1) identifier or layer two (L2) identifier of the resource UE.

19. The apparatus of claim 17, wherein execution of the instructions further cause the apparatus to periodically transmit the set of identifiers at a pre-determined periodicity or in response to an event.

20. The apparatus of claim 19, wherein the event comprises a change in detected identifiers, each of the plurality of resource UEs corresponding to a different identifier. .

* * * * *